(12) United States Patent
Womack

(10) Patent No.: US 8,254,742 B2
(45) Date of Patent: Aug. 28, 2012

(54) SPLICE HOLDER

(75) Inventor: Wade Womack, Allen, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 290 days.

(21) Appl. No.: 12/777,319

(22) Filed: May 11, 2010

(65) Prior Publication Data

US 2011/0280535 A1   Nov. 17, 2011

(51) Int. Cl.
*G02B 6/00* (2006.01)

(52) U.S. Cl. ........ 385/135; 385/134; 385/136; 385/137; 385/95

(58) Field of Classification Search ............. 385/95, 385/96, 97, 98, 99, 134, 135, 136, 137, 138
See application file for complete search history.

(56) References Cited

U.S. PATENT DOCUMENTS

| | | | |
|---|---|---|---|
| 4,840,449 A | 6/1989 | Ghandeharizadeh | |
| 5,208,893 A | 5/1993 | McCall | |
| 5,515,472 A | 5/1996 | Mullaney | |
| 5,530,786 A * | 6/1996 | Radliff et al. | 385/136 |
| 5,590,234 A | 12/1996 | Pulido | |
| 5,835,657 A | 11/1998 | Suarez | |
| 5,896,486 A | 4/1999 | Burek | |
| 6,226,439 B1 | 5/2001 | Daoud | |
| 6,240,236 B1 | 5/2001 | Daoud | |
| 6,249,635 B1 | 6/2001 | Daoud | |
| 6,249,636 B1 * | 6/2001 | Daoud | 385/137 |
| 6,285,815 B1 | 9/2001 | Daoud | |
| 6,360,051 B1 | 3/2002 | Daoud | |
| 6,512,876 B2 | 1/2003 | Daoud | |
| 6,567,601 B2 * | 5/2003 | Daoud et al. | 385/135 |
| 6,801,704 B1 | 10/2004 | Daoud | |
| 2002/0159744 A1 | 10/2002 | Daoud | |
| 2002/0191939 A1 * | 12/2002 | Daoud et al. | 385/135 |
| 2007/0047891 A1 | 3/2007 | Bayazit | |
| 2007/0274662 A1 | 11/2007 | Bayazit | |
| 2011/0280535 A1 * | 11/2011 | Womack | 385/135 |

FOREIGN PATENT DOCUMENTS

| | | |
|---|---|---|
| EP | 0150568 A1 | 8/1985 |
| FR | 2917181 A1 | 12/2008 |

* cited by examiner

*Primary Examiner* — Brian Healy
(74) *Attorney, Agent, or Firm* — Muncy, Geissler, Olds & Lowe, PLLC

(57) ABSTRACT

A splice holder includes a base member and a plurality of high wall pairs on top of the base member each having first and second wall members spaced by a first distance, and adjacent ones of the high wall pairs are spaced by a distance less than the first distance. A first plurality of low wall pairs project from the base member on one side of the high wall pairs, and a second plurality of low wall pairs project from the base member on the other side. The first and second plurality of low wall pairs are shorter than the high wall pairs. The splice holder is configured to support a first level of splices running through the low wall pairs and high wall pairs in between and a second level of splices running through the high wall pair and supported on top of two low wall pairs.

20 Claims, 5 Drawing Sheets

SPLICE HOLDER

FIELD OF THE INVENTION

The present invention is directed toward a splice holder for holding first and second layers of splices, such as optical fiber fusion splices, and more specifically, toward a splice holder for holding first and second layers of splices, such as optical fiber fusion splices, that is stackable.

BACKGROUND OF THE INVENTION

One method of joining two optical fibers involves the use of a splice, such as a fusion splice. If the splice is not properly supported, the optical fibers within the splice may be damaged. It is therefore known to use splice holders to hold splices and reduce the likelihood that the fibers within the splice will be damaged. The splice holder in turn may be mounted in an enclosure to provide further protection to the splices and/or house portions of the fibers that are joined in the splice.

Among the known splice holders are high-density holders which can hold more than one splice. These may comprise a number of vertical walls spaced by a distance approximately equal to diameter of the splice that will be retained. Splices can be pressed between such walls and retained by a friction fit.

As the number of fiber splices in a given enclosure increases, it often becomes necessary to add additional splice holders to the enclosure. However, space within enclosures where such splices are housed may be limited. It would therefore be desirable to provide a splice holder that holds a higher density of splices than has heretofore been possible and that uses the space within the enclosure efficiently.

SUMMARY OF THE INVENTION

This problem and others are addressed by embodiments of the present invention, a first aspect of which comprises a splice holder that includes a base member having a top and a bottom, first and second ends, and a length and a longitudinal centerline between the first and second ends, and first and second sides and a width between the first and second sides. A plurality of high wall pairs extend from the base member top, each of the plurality of high wall pairs comprising first and second wall members spaced by a first distance at the base member, a spacing between adjacent ones of the high wall pairs at the base member being less than the first distance. A first plurality of low wall pairs on the base member top extends along a first side of the plurality of high wall pairs, each of the first plurality of low walls pairs includes third and fourth wall members spaced by a second distance at the base member, and a spacing between adjacent ones of the first plurality of low wall pairs at the base member is less than the second distance. A second plurality of low wall pairs on the base member top extends along a second side of the plurality of high wall pairs opposite the first plurality of low wall pairs, each of the second plurality of low walls pairs comprises fifth and sixth wall members spaced by a third distance at the base member, and a spacing between adjacent ones of the second plurality of low wall pairs at the base member is less than the third distance. A height of the first plurality of low wall pairs and a height of the second plurality of low wall pairs is less than a height of the plurality of high wall pairs.

Another aspect of the invention comprises a splice holder stack comprising first and second ones of the splice holders described above, where the first splice holder includes at least one projection releasably connecting the first splice holder to the second splice holder.

An additional aspect of the invention comprises a splice holder that includes a base member having a top and a bottom, first and second ends, and a length and a longitudinal centerline between the first and second ends, and first and second sides and a width between the first and second sides. A plurality of high wall pairs on the base member top are arranged along the centerline, each of the plurality of high wall pairs comprising first and second wall members angled toward each other and spaced at the base member by a first distance and extending transversely to the longitudinal centerline, a spacing at the base member between adjacent ones of the high wall pairs being less than the first distance. A first plurality of low wall pairs on the base member top extends along a first side of the plurality of high wall pairs, each of the first plurality of low walls pairs comprises third and fourth wall members angled toward each other and spaced at the base member by a second distance, and a spacing at the base member between adjacent ones of the first plurality of low wall pairs is less than the second distance. Each of the third and fourth wall members includes a lip extending over the space between the third and fourth wall members. A second plurality of low wall pairs on the base member top extends along a second side of the plurality of high wall pairs opposite the first plurality of low wall pairs, each of the second plurality of low walls pairs comprises fifth and sixth wall members angled toward each other and spaced at the base member by a third distance, and a spacing at the base member between adjacent ones of the second plurality of low wall pairs is less than the third distance. Each of the fifth and sixth wall members includes a lip extending over the space between the fifth and sixth wall members. The first plurality of low wall pairs and the second plurality of low wall pairs have a height that is about half a height of the plurality of high wall pairs.

BRIEF DESCRIPTION OF THE DRAWINGS

These and other aspects and features of the present invention will be better understood after a reading of the following detailed description together with the attached drawings wherein.

DETAILED DESCRIPTION

Figure 1:
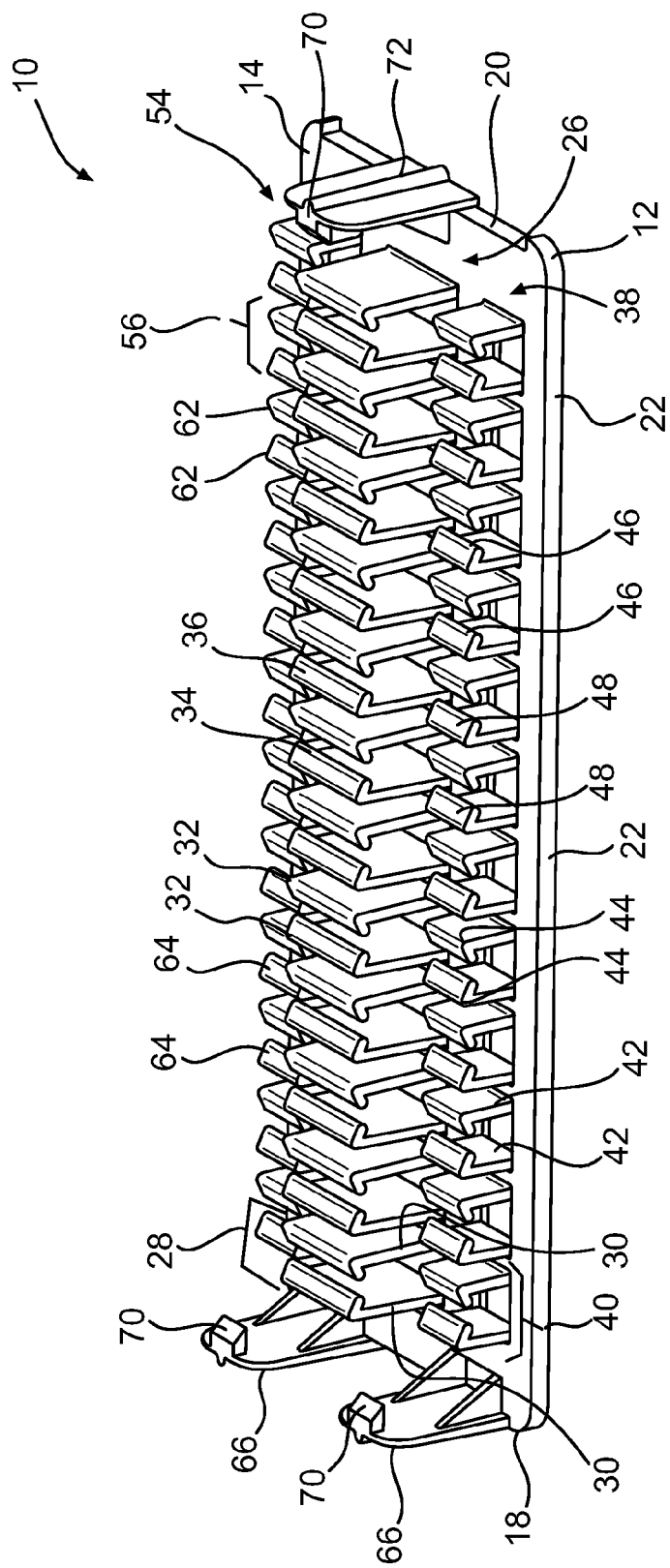
FIG. 1 is a perspective view of a splice holder according to an embodiment of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 2:
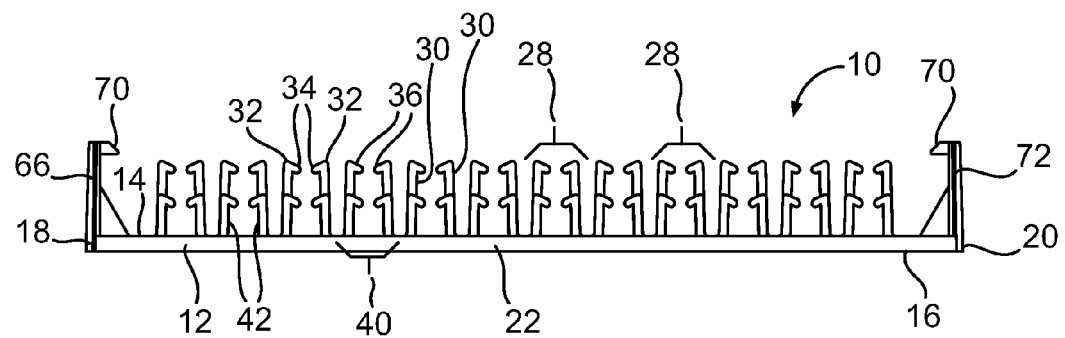
FIG. 2 is a front elevational view of the splice holder of FIG. 1.
Figure 3:
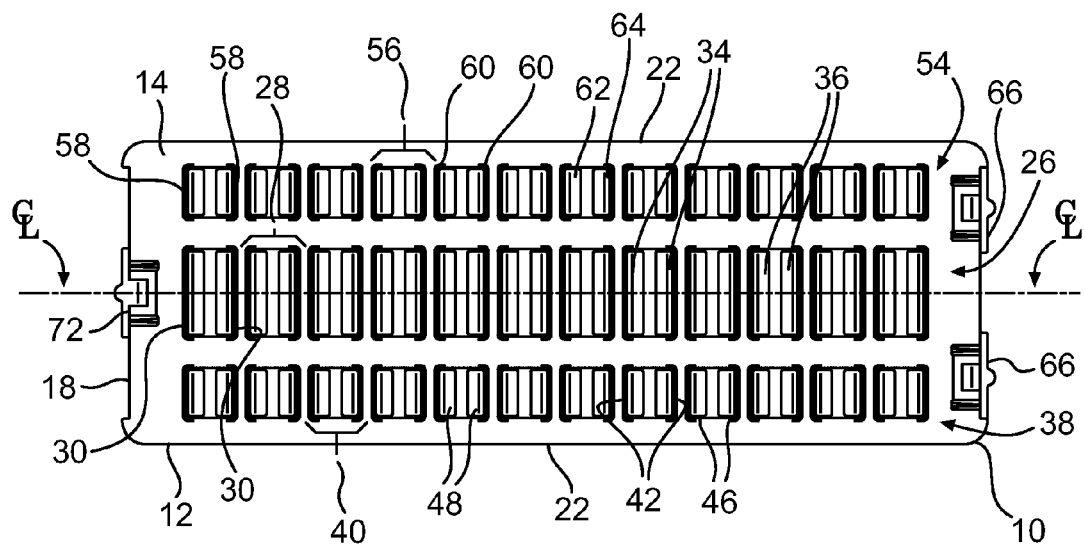
FIG. 3 is a top plan view of the splice holder of FIG. 1.
Figure 4:
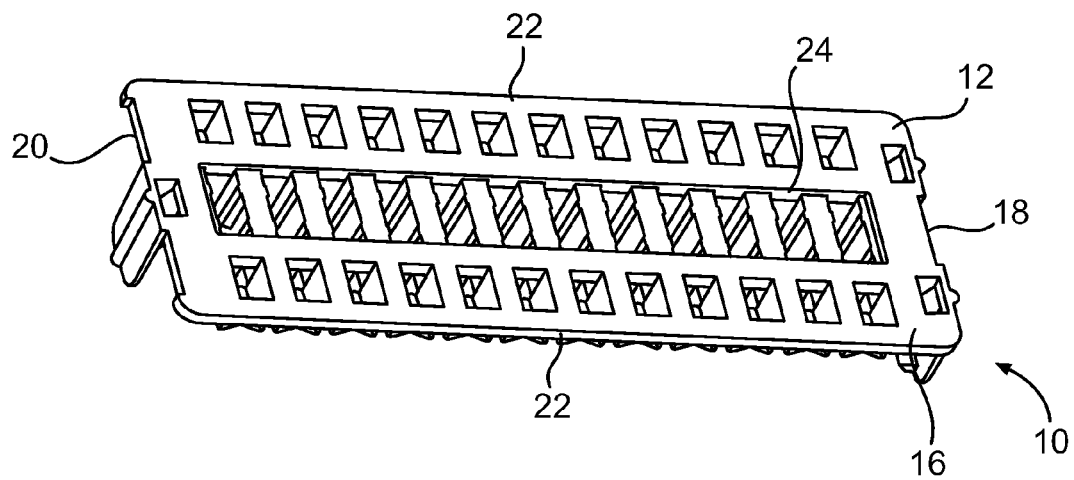
FIG. 4 is a bottom perspective view of the splice holder of FIG. 1.

FIGS. 1-3 illustrates a splice holder 10 that includes a base member 12 having a top 14, a bottom 16, a first end 18, a second end 20 and first and second sides 22. The base member 12 also includes a longitudinal centerline CL (FIG. 3) running in the longitudinal direction of splice holder 10 between first end 18 and second end 20. Base member bottom 16 includes a depression 24, illustrated in FIG. 4. A row 26 of high wall pairs 28 comprising first and second walls 30 extends between first end 18 and second end 20 of base member 12 on centerline CL of the splice holder 10. While the row 26 extends in the direction of centerline CL, the first and second walls 30 that make up each high wall pair 28 are perpendicular to centerline CL. Each of the first and second walls 30 includes a distal end 32 spaced from base member 12 and an inwardly projecting lip 34 at distal end 32 that projects over the space between the first and second walls 30. Each projecting lip 34 includes a top surface 36 that is angled toward the base member 12, and the angled surfaces 36 of a given high wall pair 28 serve as guides for guiding splices into the space between the first and second walls 30 as described below. The first and second walls 30 of each high wall pair 28 are also angled slightly toward one another. The distance between first and second walls 30 is selected based on the diameter of the splice with which the splice holder 10 is to be used and will generally be approximately equal to the diameter of such splices. The walls 30 together with projecting lips 34 may be referred to hereinafter as "wall members."

A first row 38 of first low wall pairs 40 comprising third and fourth walls 42 extends between first end 18 and second end 20 of base member 12 between row 26 of high wall pairs 28 and one side 22 of base member 12. Each of third and fourth walls 42 of first low wall pairs 40 includes a distal end 44 spaced from base member 12 and an inwardly projecting lip 46 at distal end 44 that projects over the space between the third and fourth walls 42. Each projecting lip 46 includes a top surface 48 that is angled toward the base member 12, and the angled surfaces 48 of a given first low wall pair 40 serve as guides for guiding splices into the space between third and fourth walls 42 and as supports for a second row of splices mounted on top of the first row 38 of first low wall pairs 40 as described below. The third and fourth walls 42 are angled toward each other, and, each of the low wall pairs 40 is aligned with one of the high wall pairs 28.

A second row 54 of second low wall pairs 56 comprising fifth and sixth walls 58 extends between first end 18 and second end 20 of base member on the side of row 26 of high wall pairs 28 opposite from the first row 34 of first low wall pairs 36. Each of the fifth and sixth walls 58 of the second low wall pairs 56 includes a distal end 60 spaced from base member 12 and an inwardly projecting lip 62 at distal end 60 that projects over the space between the fifth and sixth walls 58. Each projecting lip 62 includes a top surface 64 that is angled toward the base member 12 and which top surfaces 64 serve as guides for guiding splices into the space between fifth and sixth walls 56 and as supports for the second row of splices mounted on top of the second row 54 of second low wall pairs 56. The fifth and sixth walls 56 of each second low wall pair 56 are angled toward each other. The height of the first row 38 of first low wall pairs 40 is approximately equal to the height of the second row 54 of the second low wall pairs 56, and the height of the first row 38 of the first low wall pairs 40 is approximately half that of the height of the row 26 of the high wall pairs 28. Each of the second low wall pairs 56 is also aligned with one of the high wall pairs 28.

First end 18 of base member 12 includes first and second spaced projections 66, 68 disposed on either side of centerline CL, each of which includes a catch 70 projecting inwardly over base member 12. Second end 20 of base member 12 includes a third projection 72 on centerline CL which also includes a catch 70 projecting over base member 12.

Figure 5:
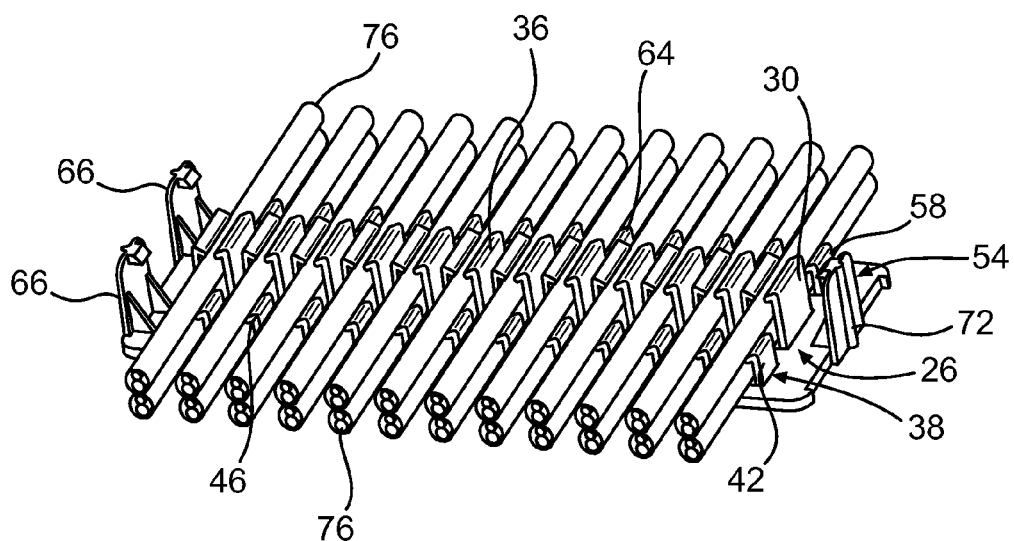
FIG. 5 is a perspective view of the splice holder of FIG. 1 with a plurality of splices mounted therein.

FIG. 5 shows a plurality of splices 76 mounted in splice holder 10. A first level 78 of splices 76 is inserted into splice holder 10 by pressing a splice between the first and second walls 30 of one of the high wall pairs 28 until the splice 76 contacts the top surfaces 48 of the third and fourth walls 42 of one of the first low wall pairs 40 and the top surfaces 64 of the fifth and sixth walls 58 of one of the second low wall pairs 56. A distance between the inwardly projecting lips 34 of the first and second walls 30 of a high wall pair 28 is less then the diameter of the splice. First and second walls 30 of the high wall pair 28 are sufficiently flexible that they can move away from one another to allow the passage of splice 76 and then return approximately to their starting positions. Next, the splice 76 contacts the lips 46 of the first low wall pair 40 and the lips 62 of the second low wall pair 56, and the splice 76 is pressed into the space between the third and fourth walls 42 of the first low wall pair 40 and into the space between the fifth and sixth walls 58 of the second low wall pairs 56 so that the splice 76 rests on top 14 of base member 12. The lips 46 of third and fourth walls 42 and the lips 62 of fifth and sixth walls 58 are also spaced apart by a distance less than the diameter of splice 76 and must also flex away from each other to allow the splice 76 to enter the space therebetween. The distance between third and fourth walls 42 at the top 14 of base member 12 and the distance between fifth and sixth walls 58 at the top 14 of base member 12 may approximately equal to the diameter of the splice 76 or slightly less than the diameter of splice 76 if a gripping pressure on the splice 76 is desired to help maintain the position of splice 76 in splice holder 10.

With the first level 78 of splices in the splice holder 10, a second layer of splices 80 is then be added. Splices 76 in second layer 80 are inserted between the spaced apart lips 34 of high wall pairs 28 as described above and then come to rest on the top surfaces 36 of lips 34 of first low wall pairs 40 and on top surfaces 64 of lips 62 of second low wall pairs 56. The spacing between the high wall pairs 28 in the location where the splices 76 come to rest is approximately equal to the diameter of the splices 76 to securely hold the splices in place. In addition, the angled top surfaces 48 of third and fourth walls 42 and the angled top surfaces 64 of fifth and sixth walls 58 define a support for the splices 76 that helps to reduce movement of splices 76 in the longitudinal direction of the splice holder 10.

Figure 6:
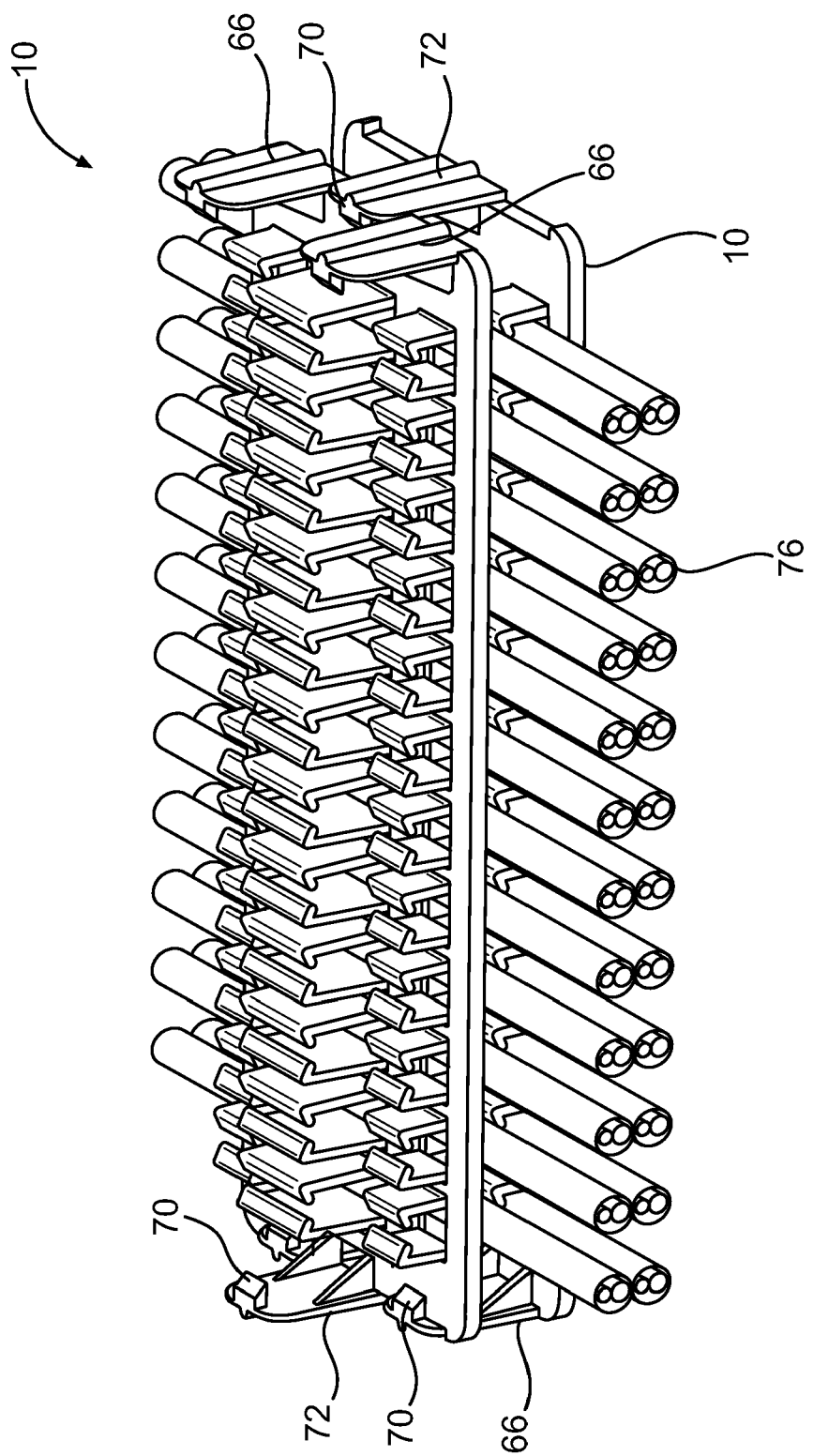
FIG. 6 is a perspective view of two of the splice holders of FIG. 1 stacked one atop the other and with a plurality of splices mounted in the lower splice holder.

The above-described structure allows for the stacking of two levels of splices 76 in the space that would have previously accommodated only one level. Splice density can be increased still further by forming a stack of two splice holders 10 as illustrated in FIG. 6. These two splice holders 10 will be referred to hereinafter as "upper" and "lower" splice holders 10 based on their relative positions in the drawings. It will be understood that the upper and lower splice holders are identical and their positions could be reversed if desired. To stack two splice holders 10, the upper splice holder 10 is positioned above the lower splice holder 10 and moved toward lower splice holder 10 until the distal ends 32 of high wall pairs 28 of the lower splice holder 10 enter depression 24 in the bottom of the upper splice holder 10. During this process, the first and second projections 66, 68 on the first end 18 of lower splice holder 10 are moved away from the third projection 72 on the second end 20 of lower splice holder 10 to allow base member 12 of the upper splice holder 10 to move past catches 70. This may be accomplished manually or by the use of suitable cam surfaces on top of the first, second and third projections 66, 68, 72 which cause the first and second projections 66, 68 to move away from the third projection 72 when the base member 12 of the upper splice holder is pressed thereagainst. The first and second projections 66, 68 and third projection 72 then flex back toward each other with catches 70 overlying or otherwise engaging a portion of base member 12 of the upper splice holder 10 to connect the upper and lower splice holders 10.

Figure 7:
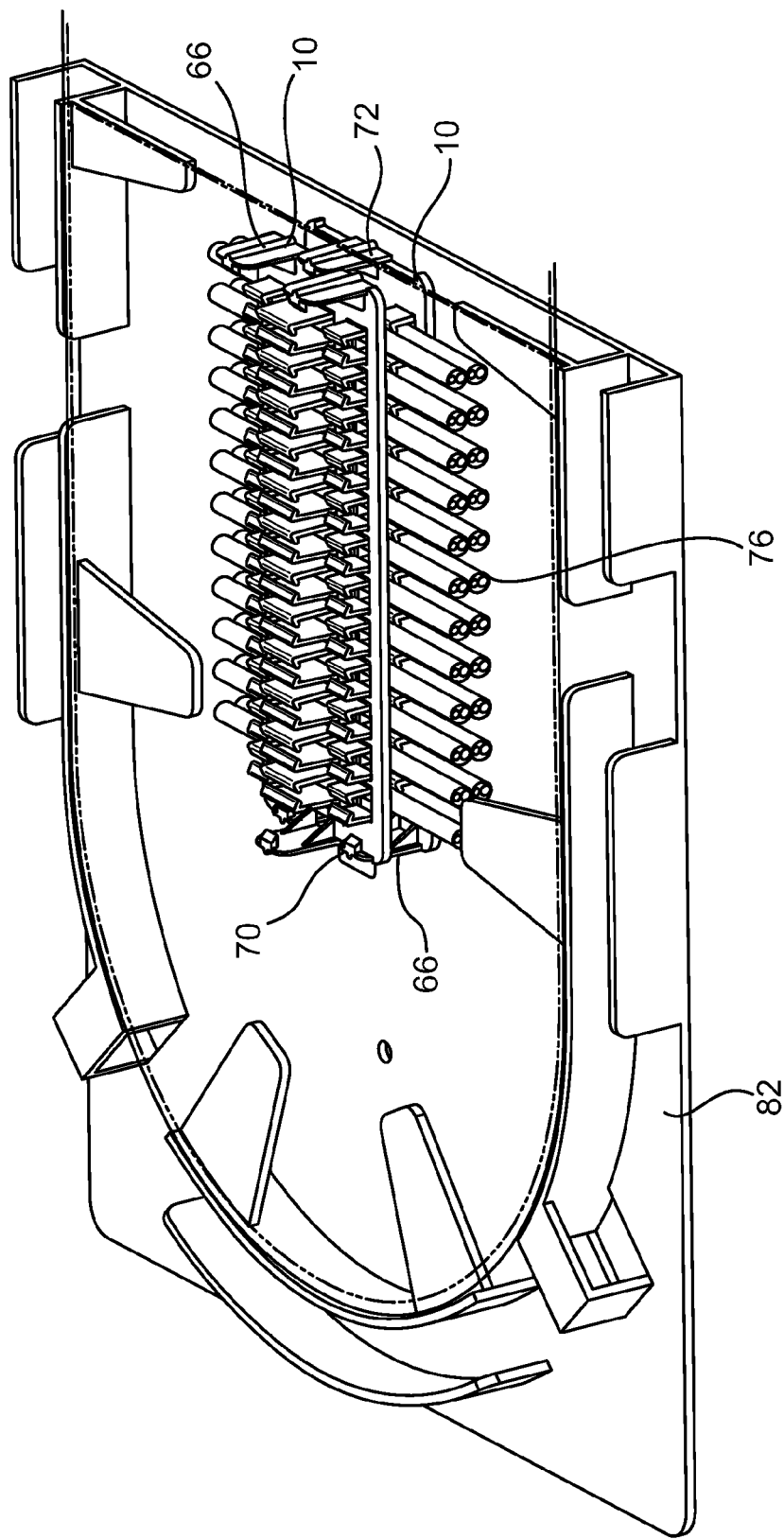
FIG. 7 is a perspective view of the two splice holders of FIG. 6 mounted in a splice tray.

Catches 70 substantially prevent the upper splice holder 10 from being moved vertically away from the lower splice holder 10 without first flexing the first, second and third projections 66, 68 and 72 to release the upper splice holder. Meanwhile the engagement of the distal ends 32 of high wall pairs 28 of the lower splice holder 10 in the depression 24 of the upper splice holder 10 substantially prevents rotation or lateral movement between the upper and lower splice holders in a direction parallel to the planes of the base members 12. The upper splice holder 10 is mounted in a position 180 degrees offset from the lower splice holder 10 so that the third projection 72 of the second end 20 of the upper splice holder 10 overlies the first end 18 of the lower splice holder 10. FIG. 7 shows a stack of two splice holders 10 in a splice tray 82. Additional splice holders can be stacked in this manner if required.

The present invention has been described in terms of a presently preferred embodiment. Modifications and additions to this embodiment will become apparent to those of ordinary skill in the relevant art upon a reading of the foregoing description. It is intended that all such modifications and additions form a part of the present invention to the extent they fall within the scope of the several claims appended hereto.

What is claimed is:

1. A splice holder comprising:
   a base member having a top and a bottom, first and second ends and a length and a longitudinal centerline between said first and second ends, and first and second sides and a width between said first and second sides;
   a plurality of high wall pairs on said base member top, each of said plurality of high wall pairs comprising first and second wall members spaced by a first distance at said base member, a spacing between adjacent ones of said high wall pairs at said base member being less than said first distance;
   a first plurality of low wall pairs on said base member top extending along a first side of said plurality of high wall pairs, each of said first plurality of low walls pairs comprising third and fourth wall members spaced by a second distance at said base member, a spacing between adjacent ones of said first plurality of low wall pairs at said base member being less than said second distance; and
   a second plurality of low wall pairs on said base member top extending along a second side of said plurality of high wall pairs opposite said first plurality of low wall pairs, each of said second plurality of low walls pairs comprising fifth and sixth wall members spaced by a third distance at said base member, a spacing between adjacent ones of said second plurality of low wall pairs at said base member being less than said third distance,
   wherein a height of said first plurality of low wall pairs and a height of said second plurality of low wall pairs is less than a height of said plurality of high wall pairs.

2. The splice holder of claim 1 wherein said plurality of high wall pairs are arranged along said longitudinal centerline.

3. The splice holder of claim 1 wherein said plurality of high wall pairs are arranged on said longitudinal centerline.

4. The splice holder of claim 1 wherein a height of said plurality of high wall pairs is approximately double a height of said first plurality of low wall pairs.

5. The splice holder of claim 4, wherein a height of said second plurality of low wall pairs is approximately the same as the height of said first plurality of low wall pairs.

6. The splice holder of claim 1 wherein said first and second wall members of said plurality of high wall pairs extend transversely to said longitudinal centerline.

7. The splice holder of claim 1 wherein, for each high wall pair of said plurality of high wall pairs, said first wall member is angled toward said second wall member.

8. The splice holder of claim 1 wherein, for each high wall pair of said plurality of high wall pairs, said first wall member and said second wall member are angled toward each other.

9. The splice holder of claim 1 wherein for each low wall pair of said first plurality of low wall pairs each first wall member includes a lip facing the second wall member.

10. The splice holder of claim 9 wherein each second wall member includes a lip facing said first wall member.

11. The splice holder of claim 1 including at least one projection on said base member first end configured to engage an additional splice holder stacked on said splice holder.

12. The splice holder of claim 9 including a first splice extending through a first one of said high wall pairs and through a first one of said plurality of first low wall pairs and a first one of said second plurality of low wall pairs adjacent to said first one of said high wall pairs, said first splice extending beneath said lip and a second splice extending through said first one of said high wall pairs on top of said first splice and above said lip.

13. The splice holder of claim 9 including a first splice extending through a first one of said high wall pairs and through a first one of said plurality of first low wall pairs and a first one of said second plurality of low wall pairs adjacent to said first one of said high wall pairs, said first splice extending beneath said lip, and a second splice extending through said first one of said high wall pairs and supported by said lip.

14. An arrangement comprising a first splice holder and a second splice holder arranged in a stack, wherein each of said first and second splice holders comprises:
   a base member having a top and a bottom, first and second ends and a length and a longitudinal centerline between said first and second ends, and first and second sides and a width between said first and second sides;
   a plurality of high wall pairs on said base member top, each of said plurality of high wall pairs comprising first and second wall members spaced by a first distance at said base member, a spacing between adjacent ones of said high wall pairs at said base member being less than said first distance;
   a first plurality of low wall pairs on said base member top extending along a first side of said plurality of high wall pairs, each of said first plurality of low walls pairs comprising third and fourth wall members spaced by a second distance at said base member, a spacing between adjacent ones of said first plurality of low wall pairs at said base member being less than said second distance; and
   a second plurality of low wall pairs on said base member top extending along a second side of said plurality of high wall pairs opposite said first plurality of low wall pairs, each of said second plurality of low walls pairs comprising fifth and sixth wall members spaced by a third distance at said base member, a spacing between adjacent ones of said second plurality of low wall pairs at said base member being less than said third distance,
   wherein a height of said first plurality of low wall pairs and a height of said second plurality of low wall pairs is less than a height of said plurality of high wall pairs,
   said first splice holder including at least one projection releasably connecting said first splice holder to said second splice holder.

15. The splice holder stack of claim 14, wherein said at least one projection comprises first and second projections at said first splice holder base member first end and a third projection at said first splice holder base member second end, each of said first, second and third projections including an inwardly projecting catch configured to engage and retain the base member of the second splice holder.

16. The splice holder stack of claim 14, wherein the first and second walls of the plurality of high wall pairs of the first splice holder each include a distal end spaced from the first splice holder base member and wherein the second splice holder base member bottom includes a depression receiving said distal ends when said first, second and third projections engage said base member of said second splice holder.

17. A splice holder comprising:
   a base member having a top and a bottom, first and second ends and a length and a longitudinal centerline between said first and second ends, and first and second sides and a width between said first and second sides;
   a plurality of high wall pairs on said base member top arranged along said centerline, each of said plurality of high wall pairs comprising first and second wall members angled toward each other and spaced at the base member by a first distance and extending transversely to said longitudinal centerline, a spacing at the base member between adjacent ones of said high wall pairs being less than said first distance;
   a first plurality of low wall pairs on said base member top extending along a first side of said plurality of high wall pairs, each of said first plurality of low walls pairs comprising third and fourth wall members angled toward each other and spaced at the base member by a second distance, a spacing at the base member between adjacent ones of said first plurality of low wall pairs being less than said second distance, each of said third and fourth wall members including a lip extending over the space between said third and fourth wall members; and
   a second plurality of low wall pairs on said base member top extending along a second side of said plurality of high wall pairs opposite said first plurality of low wall pairs, each of said second plurality of low walls pairs comprising fifth and sixth wall members angled toward each other and spaced at the base member by a third distance, a spacing at the base member between adjacent ones of said second plurality of low wall pairs being less than said third distance, each of said fifth and sixth wall members including a lip extending over the space between said fifth and sixth wall members,
   wherein said first plurality of low wall pairs and said second plurality of low wall pairs have a height that is about half a height of said plurality of high wall pairs.

18. The splice holder of claim 17 including at least one projection on said base member first end configured to engage an additional splice holder stacked on said splice holder.

19. The splice holder of claim 17 including a first splice extending through a first one of said high wall pairs and through a first one of said first plurality of low wall pairs and a first one of said second plurality of low wall pairs adjacent said first one of said high wall pairs, said first splice extending beneath said lip, and a second splice extending through said first one of said high wall pairs on top of said first splice and above said lip.

20. The splice holder of claim 17 including a first splice extending through a first one of said high wall pairs and through a first one of said first plurality of low wall pairs and a first one of said second plurality of low wall pairs adjacent said first one of said high wall pairs, said first splice extending beneath said lip, and a second splice extending through said first one of said high wall pairs and supported by said lip.

* * * * *